(12) United States Patent
Burts et al.

(10) Patent No.: US 10,888,078 B2
(45) Date of Patent: Jan. 12, 2021

(54) FISHING POLE CADDY

(71) Applicants: James Alan Burts, Clinton, UT (US); Rebecka L. Burts, Clinton, UT (US)

(72) Inventors: James Alan Burts, Clinton, UT (US); Rebecka L. Burts, Clinton, UT (US)

( * ) Notice: Subject to any disclaimer, the term of this patent is extended or adjusted under 35 U.S.C. 154(b) by 83 days.

(21) Appl. No.: 15/389,425

(22) Filed: Jan. 11, 2017

(65) Prior Publication Data

US 2018/0192628 A1    Jul. 12, 2018

(51) Int. Cl.
*A01K 97/08* (2006.01)
*A45F 3/14* (2006.01)

(52) U.S. Cl.
CPC .............. *A01K 97/08* (2013.01); *A45F 3/14* (2013.01); *A45F 2003/142* (2013.01); *A45F 2200/0566* (2013.01)

(58) Field of Classification Search
CPC ...... A01K 97/08; A45F 3/14; A45F 2003/142
USPC .................. 224/614, 913, 916, 917, 150
See application file for complete search history.

(56) References Cited

U.S. PATENT DOCUMENTS

| | | | | |
|---|---|---|---|---|
| 2,118,875 | A * | 5/1938 | Windheim | A63C 11/025 224/609 |
| 2,779,521 | A * | 1/1957 | Granberg | F41C 33/002 224/150 |
| 2,884,172 | A * | 4/1959 | Kubo | F41C 23/02 224/149 |
| 3,282,482 | A | 11/1966 | Scharsu | |
| 3,425,150 | A * | 2/1969 | Braese | A01K 87/00 43/25.2 |
| 3,515,263 | A | 6/1970 | Carlson | |
| 3,653,564 | A * | 4/1972 | Carter | F41C 23/02 224/150 |
| 3,992,799 | A | 11/1976 | Oakes | |
| 4,456,284 | A * | 6/1984 | Saka | A63C 11/025 224/917 |

(Continued)

FOREIGN PATENT DOCUMENTS

| | | | | |
|---|---|---|---|---|
| KR | 2011008254 U | * | 8/2011 | ............. A01K 97/08 |
| KR | 2011008254 U | * | 8/2011 | ............. A01K 97/08 |

OTHER PUBLICATIONS

Author: Jeong, Y. K., Title: "Bag Strap for Connecting Exhibition Fishing Case, has connection pad equipped on top end portion of rectangular transparent exhibition fishing case and fishing rod installed on inner side of exhibition fishing case." Date: Aug. 24, 2011; Doc. No. KR 2011008254 U; Cty: Korea.*

*Primary Examiner* — Nathan J Newhouse
*Assistant Examiner* — Lester L Vanterpool
(74) *Attorney, Agent, or Firm* — Jason P. Webb; Pearson Butler

(57) ABSTRACT

A fishing pole caddy including a first strap having an interior end and an exterior end. The caddy includes a second strap having an interior end and an exterior end, the interior end of the second strap is selectably removably coupled to the interior end of the first strap by a coupling device. The caddy includes an effective length adjustment device functionally coupled to at least one of the first strap and second strap such that an effective length thereof is adjustable. The caddy includes a first sheath and a second sheath coupled to the exterior end of the first and second strap respectively and shaped and orientated to receive an end of a fishing pole from an interior direction corresponding with the interior end of the first strap and second strap.

18 Claims, 7 Drawing Sheets

(56) References Cited

U.S. PATENT DOCUMENTS

| | | | | |
|---|---|---|---|---|
| 4,628,628 | A | 12/1986 | Burgin et al. | |
| 4,780,983 | A | 11/1988 | Smith | |
| D300,989 | S * | 5/1989 | Kovach | 224/916 |
| 5,040,324 | A * | 8/1991 | Rivera | A01K 97/08 224/250 |
| 5,071,048 | A * | 12/1991 | Price | A01K 97/08 224/247 |
| 5,104,017 | A * | 4/1992 | Vandagriff | A63C 11/025 224/250 |
| 5,165,584 | A * | 11/1992 | Meagher | A45F 3/14 124/88 |
| 5,341,590 | A * | 8/1994 | Hepworth | A01K 97/08 206/315.11 |
| 5,344,056 | A * | 9/1994 | Challoner | A45F 3/14 224/581 |
| 5,370,286 | A * | 12/1994 | Newman | A45F 3/14 119/857 |
| 5,383,587 | A * | 1/1995 | Carpenter | A63C 11/02 224/200 |
| 5,400,937 | A * | 3/1995 | Rottenberg | A63C 11/025 224/257 |
| 5,421,117 | A | 6/1995 | Geraci et al. | |
| 5,450,688 | A | 9/1995 | Hall | |
| 5,664,721 | A * | 9/1997 | Homeyer | F41C 33/005 224/651 |
| 5,762,242 | A * | 6/1998 | Yost | A63C 11/025 224/250 |
| 5,794,375 | A | 8/1998 | Wright | |
| 5,915,336 | A * | 6/1999 | Watson | A01K 27/005 119/797 |
| 6,155,001 | A * | 12/2000 | Marin | A01K 97/01 43/26 |
| 6,267,276 | B1 | 7/2001 | Cook | |
| 6,343,728 | B1 * | 2/2002 | Carbone | A01K 97/08 206/315.1 |
| 6,471,103 | B1 * | 10/2002 | Frese | A01K 97/08 206/249 |
| 6,584,725 | B1 | 7/2003 | Elam | |
| 6,637,077 | B2 * | 10/2003 | Doty | B60P 3/079 24/298 |
| D489,176 | S * | 5/2004 | Bazen | A01K 97/08 D3/260 |
| 6,799,707 | B2 * | 10/2004 | Gibson | A63C 11/006 224/607 |
| 6,865,841 | B2 | 3/2005 | Wieringa | |
| 7,594,354 | B1 | 9/2009 | Chadwick | |
| 8,622,265 | B2 | 1/2014 | Arajakis | |
| 9,809,288 | B1 * | 11/2017 | Newhard | B63H 16/04 |
| 2002/0178642 | A1 * | 12/2002 | Garcia | A01K 97/08 43/26 |
| 2004/0159689 | A1 | 8/2004 | Wright | |
| 2009/0057358 | A1 | 3/2009 | Cheesman | |
| 2010/0018104 | A1 | 1/2010 | Pedersen et al. | |
| 2010/0288806 | A1 | 11/2010 | Wier | A01K 97/10 224/257 |
| 2012/0227309 | A1 * | 9/2012 | Fanelli | A01K 97/08 43/26 |
| 2013/0306506 | A1 * | 11/2013 | Fraser | A01K 97/08 206/315.11 |
| 2014/0125075 | A1 * | 5/2014 | Xiques | A01K 97/08 294/143 |
| 2014/0246465 | A1 | 9/2014 | Peterson et al. | |

* cited by examiner

FISHING POLE CADDY

BACKGROUND OF THE INVENTION

Field of the Invention

The present invention relates to carrying devices, specifically a fishing pole caddy.

Description of the Related Art

A fishing rod is a long, flexible rod used to catch fish. At its simplest, a fishing rod is a simple stick or pole attached to a line ending in a hook. The length of the rod may generally vary between 2 and 20 feet. To entice fish, bait or lures are presented together with one or more hooks attached to the line. The line is generally stored on a reel which reduces tangles, allows for a much longer line, and assists in landing a fish.

Traditional rods are made from wood (e.g. bamboo), while contemporary rods are usually made from fiberglass or carbon fiber. In contrast with nets, used in subsistence and commercial fishing, fishing rods are more often used in recreational fishing and competitions. Fishing rods come in many sizes, actions, lengths and configurations depending on whether they are to be used for small, medium or large fish or in different fresh or salt water situations. Various types of fishing rods are designed for specific types of fishing. Fly rods are used to cast artificial flies, spinning rods and bait casting rods are designed to cast baits or lures. Ice fishing rods are designed to fish through small holes in ice covered lakes. Trolling rods are designed to drag bait or lures behind moving boats.

Fishing rods, along with their accoutrements, are notoriously difficult to carry. The length makes them awkward to carry. The flexibility means that the ends are likely to not be where expected and thus may catch on things. The line and hook are easily tangled and can catch on things, too. Further, fishing rods are delicate and should be kept clean. The same features that make them difficult to carry around also make them more likely to be damaged or soiled. Further, when traveling with a fishing rod, one is likely to be traveling over uneven ground and through brush and having hands free and available for balance and negotiating terrain is beneficial.

Accordingly, various techniques and devices have been developed to help people carry fishing rods. Some improvements have been made in the field. Examples of references related to the present invention are described below in their own words, and the supporting teachings of each reference are incorporated by reference herein:

U.S. Pat. No. 8,622,265, issued to Arajakis, discloses a sling system comprises a sling strap and an attachment strap. The sling strap has a first keyhole clip coupled to the sling strap. The first keyhole clip includes a first opening and a second opening smaller than the first opening in at least one dimension and in communication with the first opening. The attachment strap comprises an elastomeric body having a head extending from the body, a first neck between the head and the body, a second neck between the first neck and head and a collar between the first neck and the second neck. The first opening is larger than the head. The second opening is smaller than the head. An aperture through the body surrounds the first neck sandwiched between the collar and the body. The second opening surrounds the second neck sandwiched between the collar and the head.

U.S. Pat. No. 6,637,077, issued to Doty, discloses an adjustable strap is provided having two loops of different lengths at each end, and a tensioning mechanism on the strap for adjusting the length and tension of the overall strap. S-hooks are placed on each of the short loops with an open but closable receiving hook positioned to hook the longer loop when the latter is routed back to the short loop. For dock and boat cleats having two legs and an opening, the long loop is adapted such that it can loop the cleat generally and then have the loop end threaded through the cleat on return to the short loop where it is hooked. A closed-biased member on the S-hook can be manipulated to allow later detachment. The short and long loops are configured to lie in parallel planes such that the strap may be used in a single loop configuration and have a flat side profile.

U.S. Pat. No. 6,343,728, issued to Carbone, discloses a support bag for the enclosure and controlled support of a fishing rod and reel arrangement. The elongated flexible enclosure bag has a first end and a second end, each of the ends being open for receipt of a fishing rod therethrough. The enclosure bag being defined by a first and a second multilayer sidewall. A reel-enclosing pouch compartment is located adjacent the first end of the elongated bag, arranged to protectively enclose the reel. A first pocket is arranged on a forward portion of the first sidewall and a second pocket is arranged on a forward portion of the second sidewall for receipt of supplemental fishing gear and to provide a forward balance to the bag when a reel is enclosed adjacent the first end of the elongated bag.

U.S. Patent Application Publication No. 2014/0246465, by Peterson et al., discloses when folded this invention is so small it fits in your pocket. The only loose parts are the 10 line wraps that are contained inside the product when it's folded. When in use it's fully adjustable with no metal or plastic parts to rust or break.

U.S. Patent Application Publication No. 2013/0306506, by Fraser, discloses a tool protects fishing equipment, such as fishing rods and reels, from damage, whether the equipment is in storage or transit. The tool provides the angler with the security that their equipment will be safe. The tool includes a hollow, tubular storage chamber having one open end for inserting an end of a fishing rod therein. The storage chamber may include a buoyant material at a closed end thereof. A flexible strap extends from the open end of the storage chamber to run along the length of the fishing rod. An adjustable loop at the end of the flexible strap is adapted to loop around the reel end of the rod and can be held in place by the reel. One or more straps can be disposed along the flexible strap to secure the flexible strap to the rod. One or more rods may be carried by the tool.

The inventions heretofore known suffer from a number of disadvantages which include being limited in use, being difficult to use, taking too long to apply to a pole or to dismount from a pole, being weak/fragile, making too much noise during use/operation/dismantling, not being compact, not being versatile, failing to protect the pole during use, being difficult to store, not being safe, being unduly complex, being limited in length, being not adjustable, being expensive, being difficult to remove the fishing pole, and being substantially imbalanced such that the user experiences difficulties during operation.

What is needed is a fishing pole caddy that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available fishing pole caddies Accordingly, the present invention has been developed to provide an easy to use fishing pole caddy.

According to one embodiment of the invention, there is a fishing pole caddy that may include a first strap that may have an interior end and an exterior end. The caddy may include a second strap that may have an interior end and an exterior end, the interior end of the second strap may be selectably removably coupled to the interior end of the first strap by a coupling device. The coupling device may be a quick connect disconnectable by a single hand. The coupling device may be a length of highly elastic cord. The first and second straps may be rigid along their entire lengths. The first and second straps may be flat. The caddy may include an effective length adjustment device that may be functionally coupled to at least one of the first strap and second strap such that an effective length thereof is adjustable.

The caddy may include a first sheath that may be coupled to the exterior end of the first strap and may be shaped and orientated to receive an end of a fishing pole from an interior direction corresponding with the interior end of the first strap. The first sheath may be sufficiently rigid to keep itself open to receive during use. The caddy may include a second sheath that may be coupled to the exterior end of the second strap and may be shaped and orientated to receive an end of a fishing pole from an interior direction corresponding with the interior end of the second strap. The second sheath may be sufficiently rigid to keep itself open to receive during use.

The fishing pole caddy may include a movable handle that may be coupled to at least one of the first and second straps. The caddy may include a pair of coupling members each may be disposed at the exterior end of the first and second straps. The coupling members may be a coupling member selected from the group consisting of: clips, hooks, anchors, rings, buttons, hook and loops, hoops, fasteners, snaps, pins, zippers, ties, friction fittings, and buckles. The fishing pole caddy may include a shoulder strap that may be coupled to the pair of coupling members.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
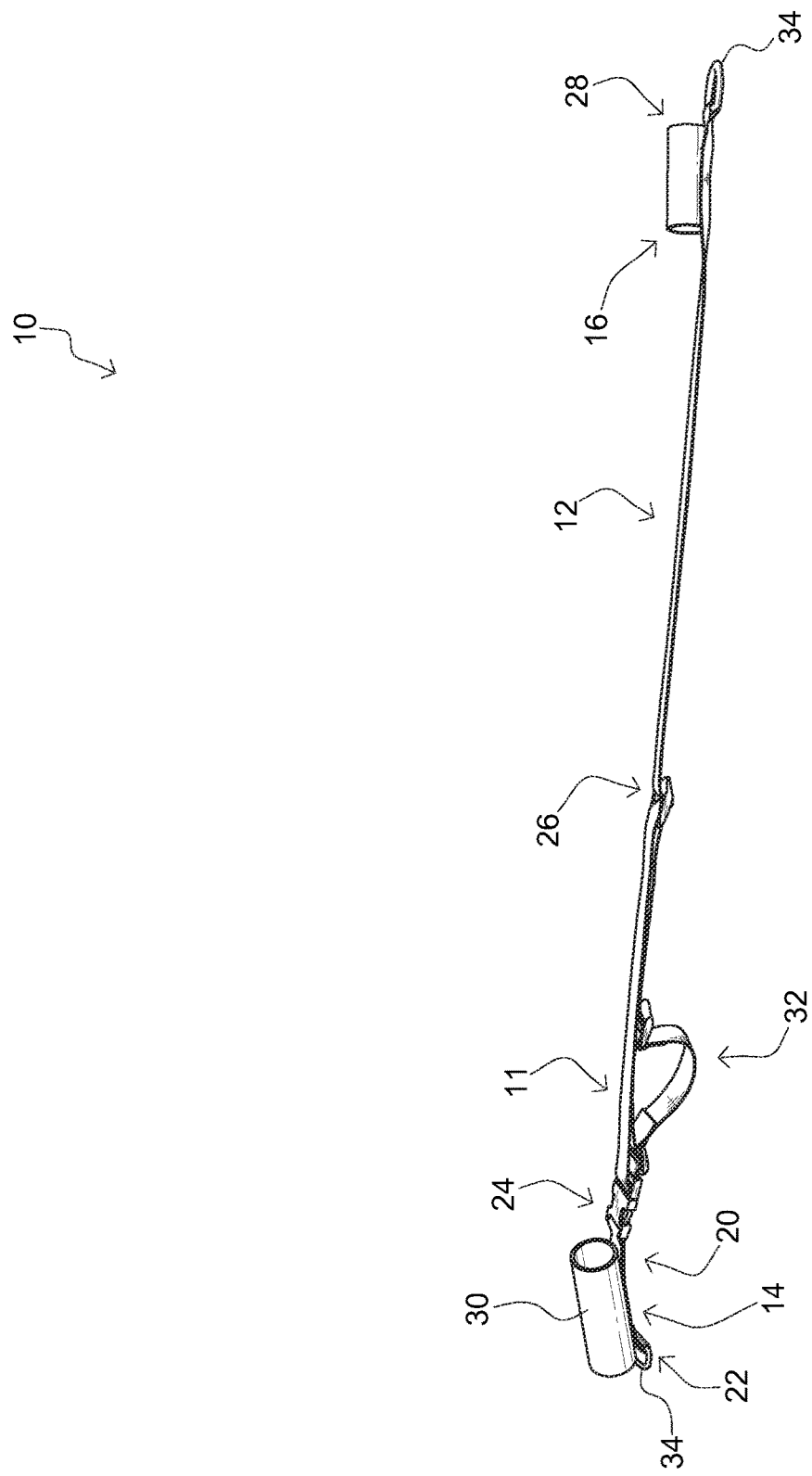
FIG. 1 is a perspective view of a fishing pole caddy, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a perspective view of a fishing pole caddy, according to one embodiment of the invention. There is shown a fishing pole caddy 10 including a first strap 12 coupled to a second strap 14 through a quick connect fitting 24. The second strap 14 is coupled to a second sheath 30, with a first sheath 28 at the other end of the caddy coupled to the first strap 12. Advantageously, a user may dispose ends of a fishing pole into the two sheaths and adjust the first and second straps to a desired length that secures the pole within the caddy. Then the user may carry the pole in the caddy by operation of the handle 32 and then use the quick connect fitting 24 to conveniently, quickly, and quietly connect and disconnect the caddy from the pole from that point forward without having to further adjust the first and second straps.

The illustrated fishing pole caddy 10 provides for storage and transportation of fishing pole(s). The caddy 10 is easily assembled onto a fishing pole and disassembled from the fishing pole when desired, especially once the effective length of the first and second straps have been adjusted to a specific pole. The caddy 10 protects the components of the pole from getting tangled, soiled, and/or damaged during use.

The illustrated fishing pole caddy 10 includes a first strap 12 having an interior end 11 and an exterior end 16. The interior end 11 of the first strap is near the second strap 14 while the exterior end 16 of the first strap is opposite the interior end 11. The illustrated first strap 12 is much longer than the illustrated second strap 14 and includes the effective length adjustment device 26. The illustrated first strap is an elongated flexible member having low elasticity (such that when subject to forces during use the straps do not elongate enough to permit the pole to disconnect from the sheath(s)), such that its effective length remains substantially the same unless altered by an adjustment device.

Often such straps are of woven fibers (e.g. cotton, nylon) and are flat but may be strips/cords/chains and/or may be of materials other than woven fibers (e.g. solid rubber, an array metal links), and/or combinations thereof. Accordingly, the first strap provides a flexible extension, in cooperation with the second strap, to space the two sheaths apart from each other. In cooperation with the adjustment device 26, the two straps 12, 14 are able to space apart the sheaths at a range of effective distances, thereby allowing the caddy to adapt to various poles.

The illustrated caddy 10 includes a second strap 14 having an interior end 20 and an exterior end 22, the interior end 20 of the second strap 14 is selectably removably coupled to the interior end 14 of the first strap 12 by a coupling device 24, the illustrated quick connect fitting. The interior end 20 of the second strap is near the first strap 12 while the exterior end 22 of the second strap is opposite the interior end 20. The illustrated second strap 14 is short compared to the first strap and protrudes a small amount from the end of the second sheath 30. The first and second straps are removably coupled to each other by a coupling device 24.

It is advantageous to have the second strap be substantially shorter than the first strap so that the coupling device is located very near the second sheath. This simplifies removal of the caddy from the pole and makes replacing the same less awkward and difficult. Further, it is common for effective length adjustment devices 26 to utilize the length of the strap in their function and this large difference in length between the first and second straps maximizes the adjustability of the effective length of the caddy, thereby broadening the range of pole with which the caddy will function and reducing the complexity and cost of the caddy itself. The illustrated second strap is an elongated flexible member having low elasticity (such that when subject to forces during use the straps do not elongate enough to permit the pole to disconnect from the sheath(s)), such that its effective length remains substantially the same unless altered by an adjustment device.

Often such straps are of woven fibers (e.g. cotton, nylon) and are flat but may be strips/cords/chains and/or may be of materials other than woven fibers (e.g. solid rubber, an array metal links), and/or combinations thereof. Accordingly, the second strap provides a flexible extension, in cooperation with the first strap, to space the two sheaths apart from each other. In cooperation with the adjustment device 26, the two straps 12, 14 are able to space apart the sheaths at a range of effective distances, thereby allowing the caddy to adapt to various poles.

The illustrated coupling device 24 removably couples the first strap 12 and second strap 14 together, such that they may be disconnected as desired but with sufficient strength that they remain connected while the user is carrying a pole therewith. The coupling device 24 is positioned near the second sheath 30 so that when disconnected, there is only one long strap (e.g. the first strap) and the other is very compact, essentially being a sheath with a strap slightly protruding therefrom.

The illustrated coupling device 24 is a quick connect disconnectable by a single hand. Advantageously, quick connect fittings/coupling devices allow for connection and disconnection without tools and often permit the same with operation of a single hand. There are various types of quick connects which include but are not limited to trap hooks (e.g. safety pins, hooks with a bias member at the opening that permits entry into the hook but prevents exit therefrom), ball locks, roller locks, pin locks (e.g. center release buckles), hook locks (e.g. the illustrated side-release buckles), bayonet couplings, ring locks, and cam locks (e.g. cam buckles).

The illustrated fishing pole caddy 10 includes an effective length adjustment device 26 functionally coupled to at least one of the first strap and second strap such that an effective length thereof is adjustable. The illustrated effective length adjustment device 26 is a buckle that is fixedly coupled to the first strap 12 at an end thereof distal from the first sheath, wherein that end folds back on the first strap and a middle region of the first strap is slidably trapped within the buckle together with the distal end. The adjustment device is shaped such that the middle region of the first strap is held in place with respect to the adjustment device by friction which is stronger when the first strap is pulled tight and less when the first strap is loose and bent near the adjustment device.

Accordingly, the adjustment device may slide along the middle region as desired, and thereby changing the effective length of the first strap. When the desired effective length is achieved, the first strap may be pulled tight (e.g. by applying the caddy to a pole) and thereby the effective length essentially remains constant during the use of the caddy. Should it be necessary to carry a pole having a different length, the first strap may be adjusted in effective length by operation of the adjustment device while the first strap is slack and then when/as the first strap achieves a desired length, the tightness of the fit with the pole will cause the length to remain constant as desired.

The illustrated adjustment device is a tri-glide type buckle, which includes two apertures spaced by a brace. The distal end of the first strap is fixedly coupled to the brace while the middle region loops through the two apertures (i.e. in one and out the other resting against the brace). Other types of length adjustment devices may be utilized, including but not limited to prong buckles (e.g. commonly used with belts), clasps, turnbuckles, other types of glides/buckle trims, ties, and the like and combinations thereof.

The illustrated caddy 10 includes a first sheath 28 coupled to the exterior end 16 of the first strap 12. The first sheath 28 is shaped and orientated to receive an end of a fishing pole from an interior direction corresponding with the interior end 14 of the first strap 12. The illustrated caddy 10 includes a second sheath 30 coupled to the exterior end 22 of the second strap 14. The second sheath 30 is shaped and orientated to receive an end of a fishing pole from an interior direction corresponding with the interior end 20 of the second strap 14. The illustrated sheaths are each a hollow cylinder of rigid/semi-rigid material capped at one end (exterior) and open at the other end (interior) such that the sheath can receive an end of a fishing pole therein and retain the same in cooperation with the other sheath. Such may be embodied simply as a short length of pipe that is capped at one end. The sheath need not be as rigid as a pipe (e.g. it could be a cloth sheath with a hardening agent to help it keep its form but still be flexible), but it is beneficial if is it sufficiently rigid so as to hold itself open when the user is placing the fishing pole therein, thus not requiring a hand to hold it open during that process.

The illustrated fishing pole caddy 10 includes a movable handle 32 coupled to at least one of the first and second straps. The illustrated movable handle 32 is coupled to the first strap 12 by a pair of adjustable buckles. The illustrated adjustable buckles are tri-glide type buckles. The handle includes a handle strap fixedly coupled to each adjustable buckle at an interior end thereof. It may be that the handle is removably coupled to the buckles so that the handle can be removed/interchanged as desired.

The illustrated caddy 10 includes a pair of coupling members 34 each disposed at the exterior end of the first strap 12 and the second strap 14. The illustrated coupling members are D-rings disposed within a looped region at each end of the caddy. The coupling members allow the user to place the caddy on a hook or peg that may be on a wall and thereby store the caddy, with or without an accompanying fishing pole. Coupling members may be embodied as rings, hooks, grommets, hook-and-loop patches, clips, snaps, fasteners and the like and combinations thereof.

According to one embodiment of the invention, there is a fishing pole caddy 10 designed to secure and store a fishing pole therein, and provides a fast and easy method of attaching and detaching the fishing pole from the fishing pole caddy 10. The fishing pole caddy 10 includes an adjustable main strap 12, with a quick connect 24 disposed at one end thereof. The fishing pole caddy 10 includes semi rigid end caps 28, 30 along with an adjustable handle 32 along the strap 12. The caddy 10 includes a pair of D-rings at both ends of the strap 12, 14. The quick connect 24 allows a user to quickly and easily disconnect without adjusting the effective length of the strap 12. The fishing pole caddy is easy to use, adjustable, quick, quiet, compact, strong, versatile, protective, easily stored, durable, safer, and/or more balanced as compared to other carrying devices.

Figure 2:
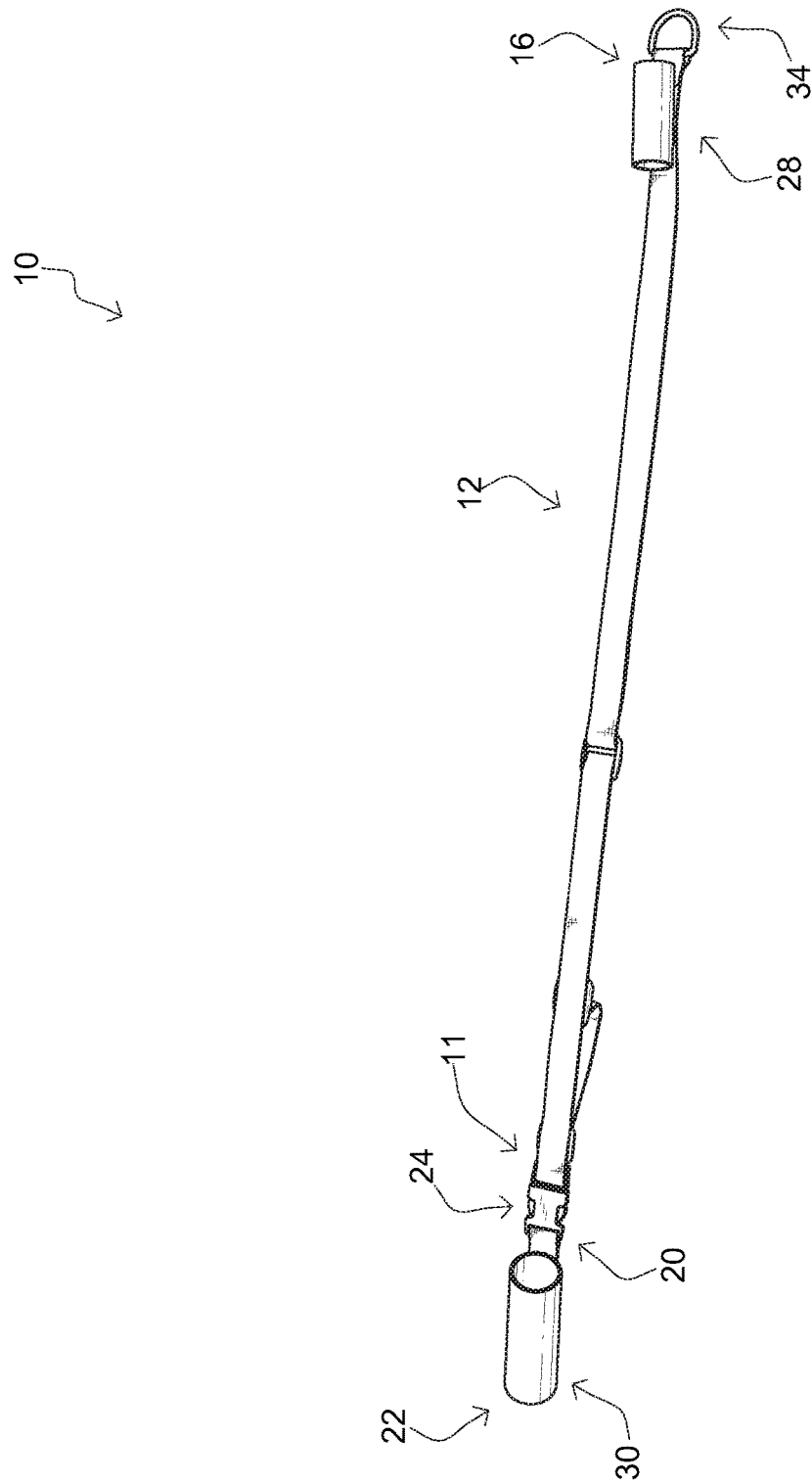
FIG. 2 is a perspective view of a fishing pole caddy, according to one embodiment of the invention.

FIG. 2 is a top perspective view of a fishing pole caddy, according to one embodiment of the invention. There is shown a fishing pole caddy 10 including a first strap 12 coupled to a second strap by a coupling device 24.

The illustrated fishing pole caddy 10 includes a first strap 12 having an interior end 11 and an exterior end 16. The caddy 10 includes a first strap 12 having an interior end 20 and an exterior end 22, the interior end 20 of the second strap is selectably removably coupled to the interior end 11 of the first strap 12 by a coupling device 24. The illustrated coupling device 24 is a quick connect disconnectable by a single hand. The illustrated first strap 12 and the second strap are rigid along their entire lengths. The illustrated first strap 12 and the second strap are flat.

The illustrated fishing pole caddy 10 includes an effective length adjustment device functionally coupled to the first strap 12. such that an effective length thereof is adjustable. The second strap may include an effective length adjustment device functionally coupled thereto. The fishing pole caddy 10 includes a first sheath 28 coupled to the exterior end 16 of the first strap 12. The first sheath 28 is shaped and orientated to receive an end of a fishing pole from an interior direction corresponding with the interior end 11 of the first strap 12. The illustrated first sheath 28 is sufficiently rigid to keep itself open to receive during use.

The illustrated fishing pole caddy 10 includes a second sheath 30 coupled to the exterior end 22 of the second strap. The illustrated second sheath is shaped and orientated to receive an end of a fishing pole from an interior direction corresponding with the interior end 20 of the second strap. The illustrated second sheath 30 is sufficiently rigid to keep itself open to receive during use. The caddy 10 includes a pair of coupling members 34, such as D-rings, each disposed at the exterior end 16, 20 of the first strap 12 and the second strap. The coupling members may be a coupling member selected from the group consisting of: clips, hooks, snaps, fasteners, buttons, hook and loops, anchors, etc.

Figure 3:
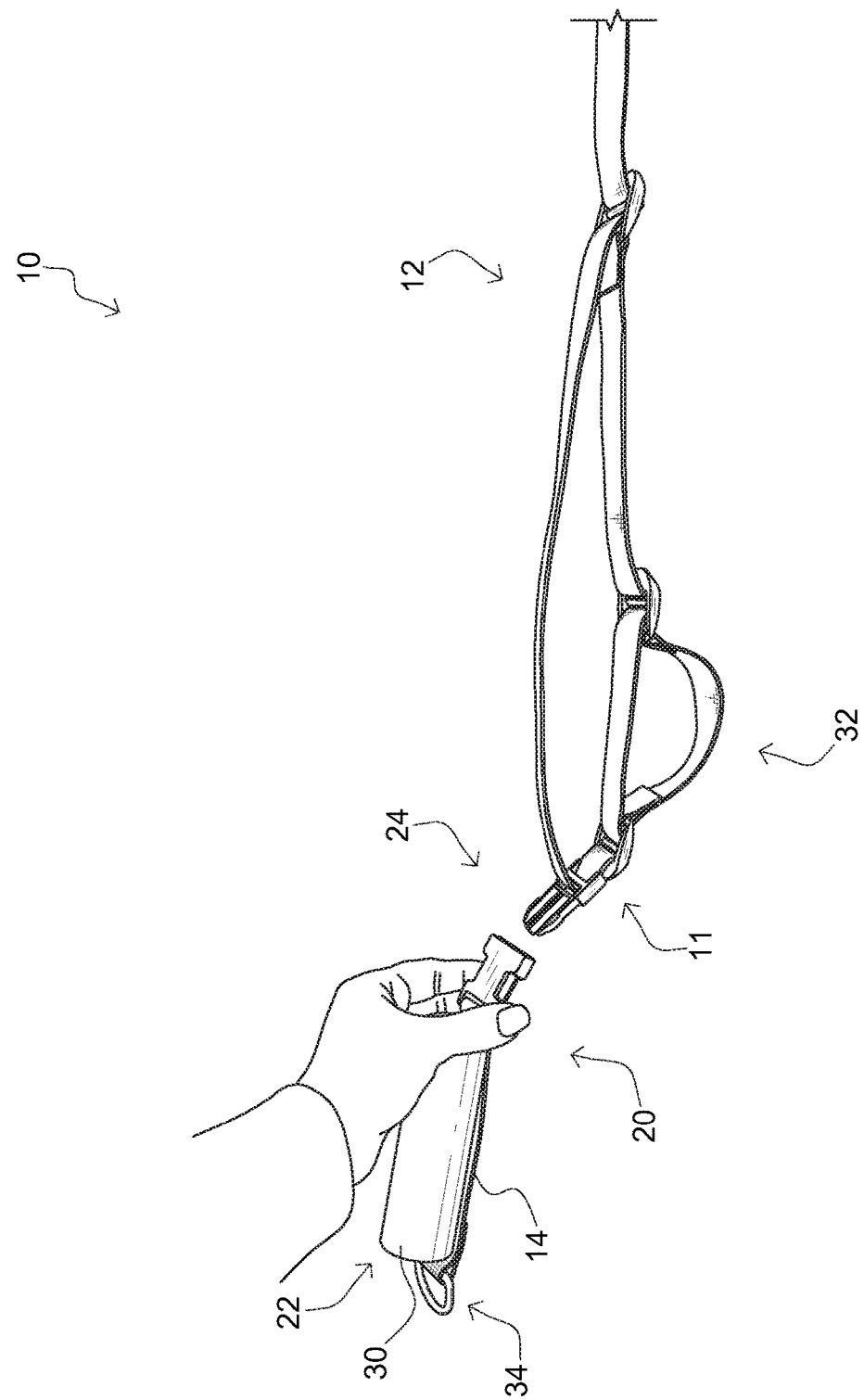
FIG. 3 is a perspective view of a first strap and a second strap of a fishing pole caddy, according to one embodiment of the invention.

FIG. 3 is a perspective view of a first strap and a second strap of a fishing pole caddy, according to one embodiment of the invention. There is shown a fishing pole caddy 10 including a first strap 12 detached from a second strap 14 by a single hand of a user.

The illustrated fishing pole caddy 10 includes a first strap 12 having an interior end 11. The caddy 10 includes a second strap 14 having an interior end 20 and an exterior end 22, the interior end 20 of the second strap 14 is selectably removably coupled to the interior end 11 of the first strap 12 by a coupling device 24. The illustrated coupling device 24 is a quick connect disconnectable by a single hand.

The illustrated fishing pole caddy 10 includes a second sheath 30 coupled to the exterior end 22 of the second strap 14. The illustrated second sheath 30 is shaped and orientated to receive an end of a fishing pole from an interior direction corresponding with the interior end 20 of the second strap 14. The illustrated second sheath 30 is sufficiently rigid to keep itself open to receive during use. The caddy 10 includes a coupling member 34, such as D-ring, disposed at the exterior end 20 of the second strap 14. The fishing pole caddy 10 includes a movable handle 32 coupled to the first strap 12 at the interior end 11.

According to one embodiment of the invention there is a fishing pole caddy 10 including a strap having a quick connect 24 coupling a first region 12 of the strap to a second region 14 of the strap. The caddy 10 includes a pair of D-Rings at each far end of the strap. The caddy 10 includes a pair of semi rigid sheaths at each far end region of the strap but before the D-rings. The caddy 10 includes an adjustable handle 32 disposed on the strap.

Figure 4:
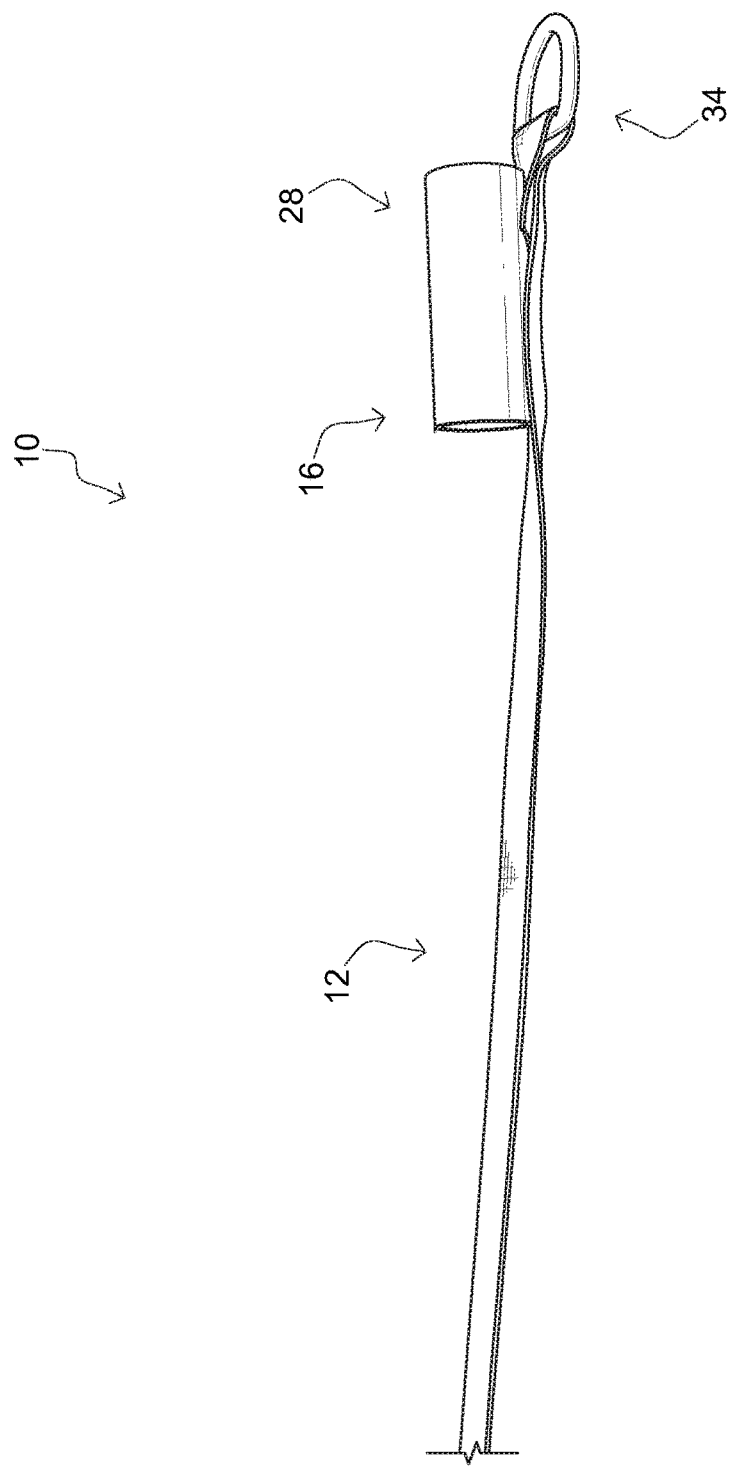
FIG. 4 is a perspective view of a first strap of a fishing pole caddy, according to one embodiment of the invention.

FIG. 4 is a perspective view of a first strap of a fishing pole caddy, according to one embodiment of the invention. There is shown a fishing pole caddy 10 including a first strap 12 having a first sheath 28.

The illustrated fishing pole caddy 10 includes a first strap 12 having an interior end (not shown) and an exterior end 16. The illustrated first strap 12 is rigid along the entire length thereof. The illustrated first strap 12 is flat. The illustrated fishing pole caddy 10 includes a first sheath 28 coupled to the exterior end 16 of the first strap 12. The first sheath 28 is shaped and orientated to receive an end of a fishing pole from an interior direction corresponding with the interior end of the first strap 12. The illustrated first sheath 28 is sufficiently rigid to keep itself open to receive during use. The illustrated first sheath 28 is designed to receive an end of a fishing pole, such as an end opposite of a handle of a fishing pole. The end of the fishing pole is designed to rest within the first sheath 28 and thereby protecting and securing the end of the fishing pole therein. The caddy 10 includes a coupling member 34, such as D-ring, disposed at the exterior end 16 of the first strap 12.

Figure 5:
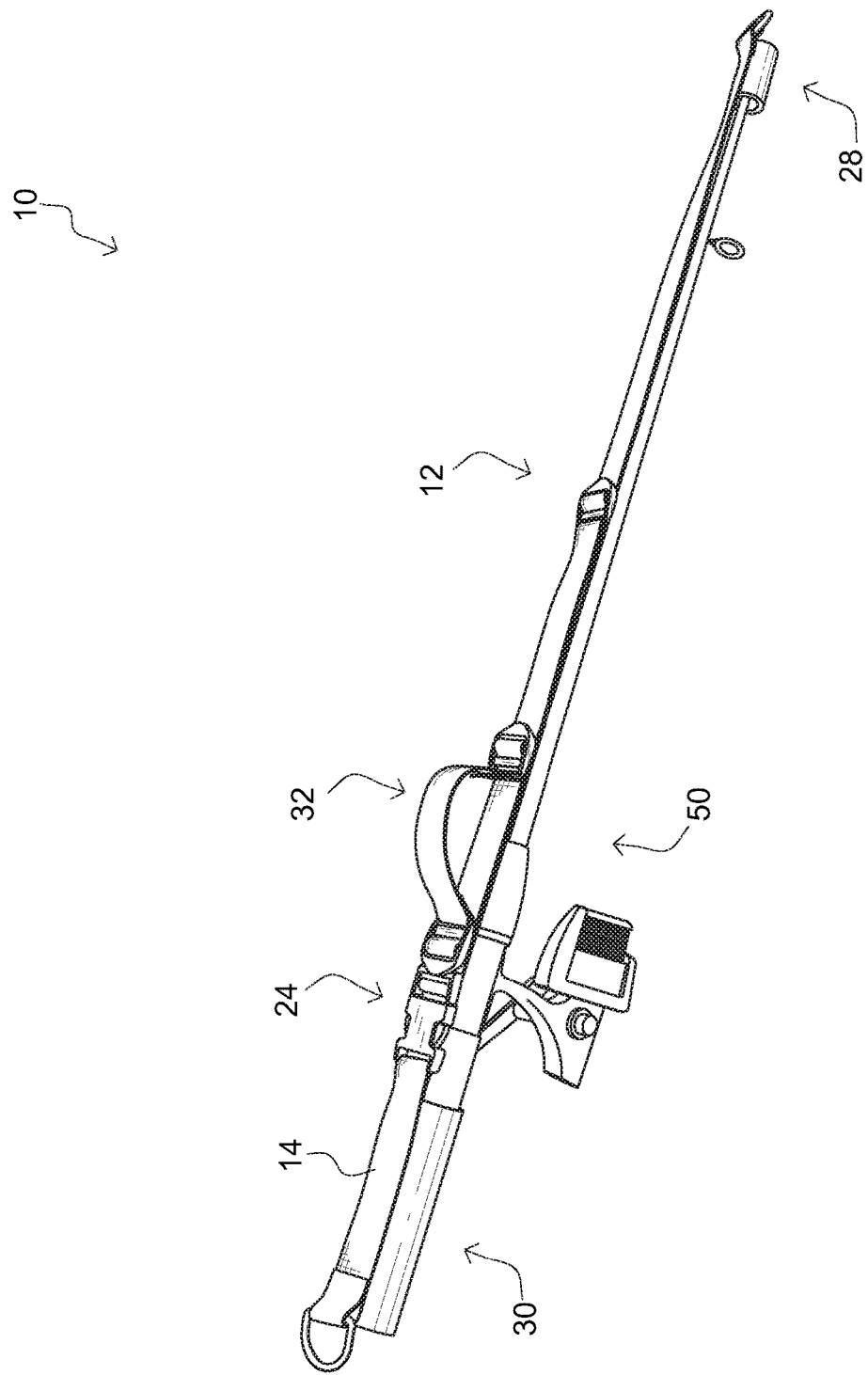
FIG. 5 is a perspective view of a fishing pole coupled to the fishing pole caddy, according to one embodiment of the invention.

FIG. 5 is a perspective view of a fishing pole coupled to the fishing pole caddy, according to one embodiment of the invention. There is shown a fishing pole 50 disposed within a fishing pole caddy 10.

The illustrated fishing pole caddy 10 is designed to receive a fishing pole and provide easy access and storage thereof. The fishing pole caddy 10 includes a first strap 12 coupled a second strap 14. The first strap 12 is removably coupled to the second strap 14 by a coupling device 24. The illustrated coupling device 24 is a quick connect disconnectable by a single hand. The fishing pole caddy 10 includes a first sheath 28 coupled to the first strap 12. The first sheath 28 is shaped and orientated to receive an end of the fishing pole 50 from an interior direction corresponding with an interior end of the first strap 12. The illustrated first sheath 28 is sufficiently rigid to keep itself open to receive during use.

The illustrated fishing pole caddy 10 includes a second sheath 30 coupled to the second strap 14. The illustrated second sheath 30 is shaped and orientated to receive an end of a fishing pole from an interior direction corresponding with an interior end of the second strap 14. The illustrated second sheath 30 is sufficiently rigid to keep itself open to receive during use. The illustrated second sheath 30 is designed to receive a handle region of the fishing pole 50. The second sheath 30 includes a circumference that is slightly larger than most circumferences of fishing pole handles, thereby providing a secure storing of the fishing pole 50 during travel or use. The fishing pole caddy 10 includes a movable handle 32 coupled to the first strap 12. The movable handle 32 is designed to be positioned to provide a balance point while carrying the fishing pole caddy 10, thereby providing effortless carrying of the caddy.

According to one embodiment of the invention, there is a fishing pole caddy 10 including a pair of semi-rigid sheaths 20, 30 facing each other with a quick connect 24 coupling a pair of straps 12, 14. The pair of straps 12, 14 may be a single adjustable strap, which may include cord, rope, multiple straps, integrated shoulder strap, adjustment at an integrated shoulder strap. The caddy 10 includes a quick connect 24, wherein the quick connect may vary in placement, may be flipped or reversed, may include a bungee cord instead of a quick connect to allow a user to pull apart the adjustable strap off instead of disconnecting the straps altogether. The caddy 10 includes a pair of D-Rings. The fishing pole caddy 10 includes a pair semi rigid sheaths 28, 30, however, the sheaths may be not rigid (e.g. socks), fully rigid, sheath only on one end, may be rings, may be an array of rings, may be cage-style sheath, may include a loop. The fishing pole caddy 10 includes an adjustable handle 32, wherein the handle may not adjustable, may not lock into place, may lock into place, may be toggleable instead of slide adjustable. The caddy 10 includes a strap length adjuster, which may include various types of adjusters, quick adjusters, non-adjustable, pass-through style quick adjuster, and may be adjusted on the opposite end or on both ends.

Figure 6:
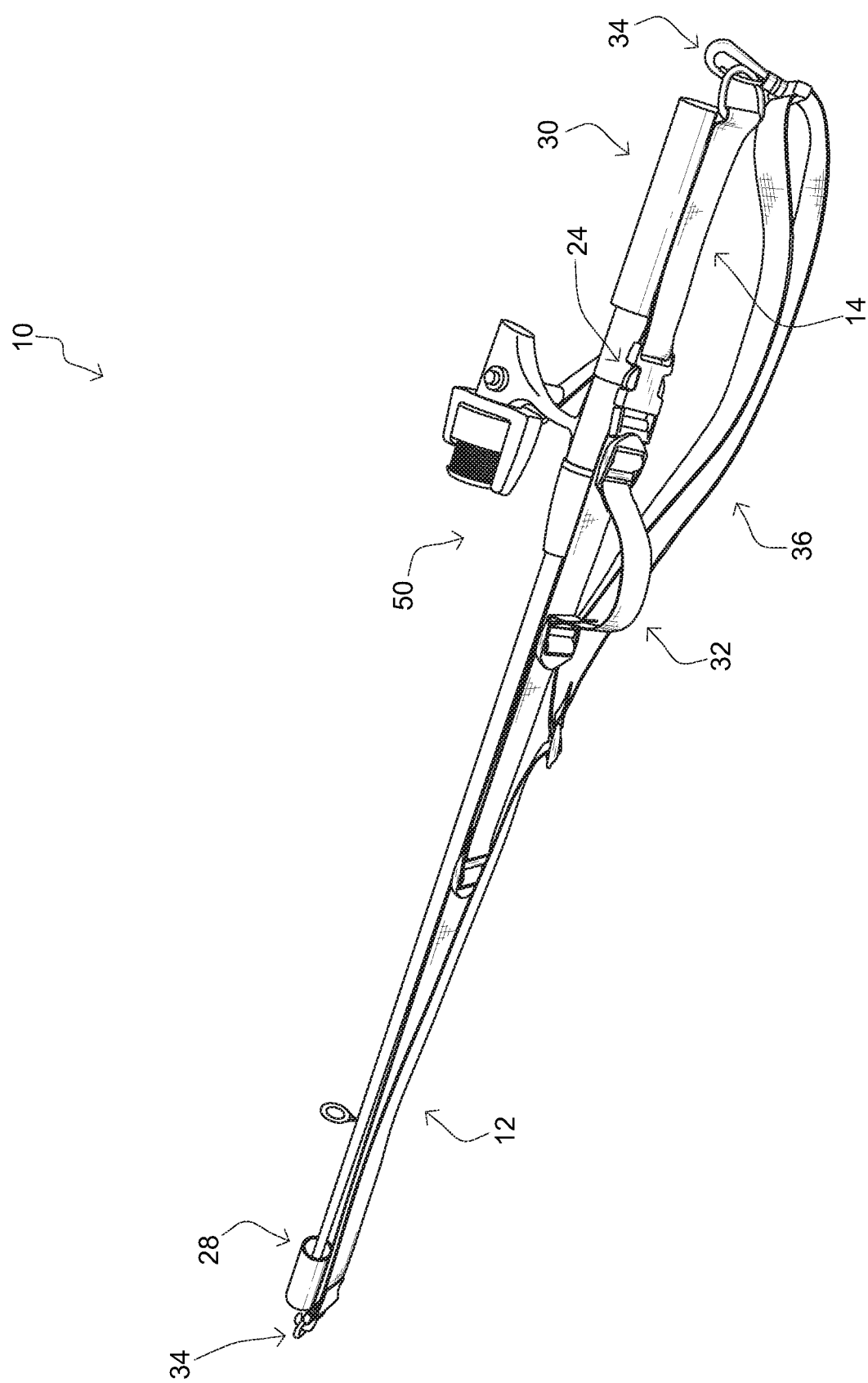
FIG. 6 is a perspective view of a fishing pole coupled to a fishing pole caddy, according to one embodiment of the invention.

FIG. 6 is a perspective view of a fishing pole coupled to a fishing pole caddy, according to one embodiment of the invention. There is shown a fishing pole 50 disposed within a fishing pole caddy 10.

The illustrated fishing pole caddy 10 includes a first strap 12 having an interior end and an exterior end. The caddy 10 includes a second strap 14 having an interior end and an exterior end, the interior end of the second strap 14 is selectably removably coupled to the interior end of the first strap 12 by a coupling device 24. The illustrated coupling device 24 is a quick connect disconnectable by a single hand. The illustrated first strap 12 and the second strap 14 are rigid along their entire lengths. The illustrated first strap 12 and the second strap 14 are flat.

The illustrated fishing pole caddy 14 includes an effective length adjustment device 26 functionally coupled to the first strap 12. such that an effective length thereof is adjustable. The fishing pole caddy 10 includes a first sheath 28 coupled to the exterior end of the first strap 12. The first sheath 28 is shaped and orientated to receive an end of a fishing pole 50 from an interior direction corresponding with the interior end of the first strap 12. The illustrated first sheath 28 is sufficiently rigid to keep itself open to receive during use.

The illustrated fishing pole caddy 10 includes a second sheath 30 coupled to the exterior end of the second strap 14. The illustrated second sheath is shaped and orientated to receive an end of a fishing pole 50 from an interior direction corresponding with the interior end of the second strap 14. The illustrated second sheath 30 is sufficiently rigid to keep itself open to receive during use. The caddy 10 includes a pair of coupling members 34, such as D-rings, each disposed at the exterior ends of the first strap 12 and the second strap 14. The illustrated fishing pole caddy 10 includes a shoulder strap 36 coupled to the pair of coupling members 34 by a pair of hooks with bias members that allow material to pass-through and enter the hook but not leave. The fishing pole caddy 10 includes a movable handle 32 coupled to the first strap 12.

Figure 7:
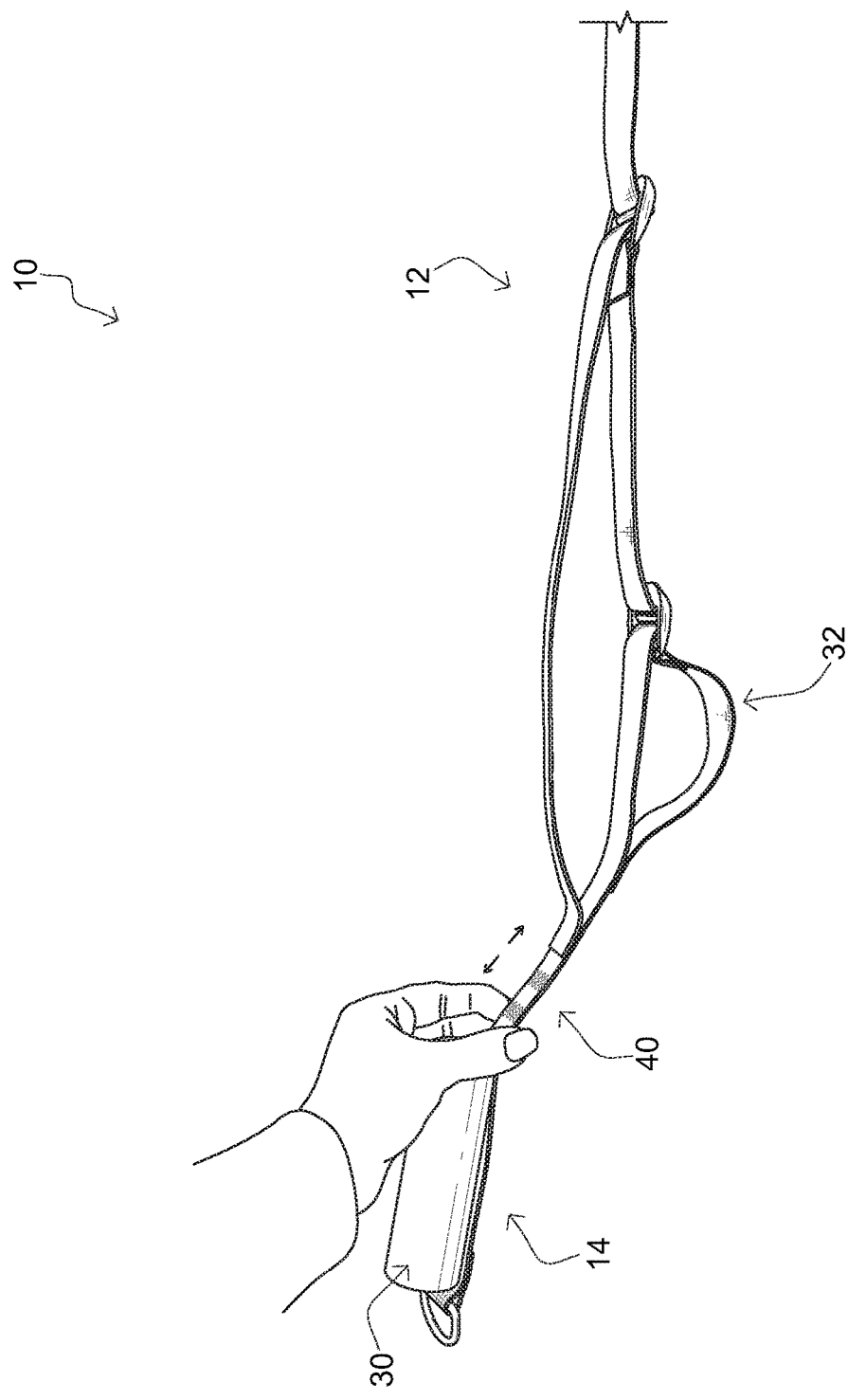
FIG. 7 is a perspective view of a first strap and a second strap of a fishing pole caddy, according to one embodiment of the invention.

FIG. 7 is a perspective view of a first strap and a second strap of a fishing pole caddy, according to one embodiment of the invention. There is shown a fishing pole caddy 10 including a first strap 12 permanently attached to a second strap 14 by a coupling device, such as a length of highly elastic cord 40.

The illustrated fishing pole caddy 10 includes a first strap 12 having an interior end. The caddy 10 includes a second strap 14 having an interior end and an exterior end, the interior end of the second strap 14 is permanently coupled to the interior end of the first strap 12 by a coupling device, the illustrated coupling device is a length of highly elastic cord 40. The illustrated fishing pole caddy 10 includes a second sheath 30 coupled to the exterior end of the second strap 14. The illustrated second sheath 30 is shaped and orientated to receive an end of a fishing pole from an interior direction corresponding with the interior end of the second strap 14.

The illustrated second sheath 30 is sufficiently rigid to keep itself open to receive during use. The user simply pulls on the second strap 14 about a region between the coupling device and the second sheath, thereby creating sufficient space for the user to insert or remove a fishing pole therefrom. The fishing pole caddy 10 includes a movable handle 32 coupled to the first strap 12.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate straps that are flat and in a particular configuration, there may be straps that are cords, multiple straps, and/or there may be an integrated shoulder strap instead of a separate strap.

It is also envisioned that the quick connect could be replaced by a length of elastic material (e.g. bungee cord) having sufficient length and elasticity such that the first and second strap are coupled therebetween and the user simply pulls on the two sheaths apart until they are far enough apart to insert/remove the fishing pole from the sheaths but strong enough so that the fishing pole is securely held therein.

It is expected that there could be numerous variations of the design of this invention. An example is that the sheaths could be of various designs, including but not limited to being an array of rings, a cage-style sheath, pipe, a set of loops and the like and combinations thereof. Another example is that adjuster buckles may be of various types e.g. quick release buckles, buckles requiring tools to adjust, pass-through style adjusters, adjusters that require clamping or other action to allow them to adjust, cam-style buckles and the like and combinations thereof.

Finally, it is envisioned that the components of the device may be constructed of a variety of materials, Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A fishing pole caddy, comprising:
    a) a first strap having an interior end and an exterior end;
    b) a second strap having an interior end and an exterior end, the interior end of the second strap being coupled to the interior end of the first strap by a coupling device;
    c) at effective length adjustment device functionally coupled to at least one of the first strap and second strap such that an effective length thereof is adjustable;
    d) a first sheath coupled at the exterior end of the first strap such that a terminal portion of the exterior end of the first strap extends beyond a far end of the first sheath and the first sheath is shaped and orientated to receive an end of a fishing pole from an interior direction corresponding with the interior end of the first strap; and
    e) a second sheath coupled at the exterior end of the second strap such that a terminal portion of the exterior end of the first strap extends beyond a far end of the second sheath and the second sheath is shaped and orientated to receive an end of a fishing pole from an interior direction corresponding with the interior end of the second strap.

2. The caddy of claim 1, further comprising a movable handle coupled to at least one of the first and second straps.

3. The caddy of claim 1, further comprising a pair of coupling members each disposed at the exterior end of the first and second straps and extending from the terminal portion thereof.

4. The caddy of claim 3, wherein the coupling members are coupling members selected from the group consisting of clips, hooks, anchors, rings, buttons, hook and loops, hoops, fasteners, snaps, pins, zippers, ties, friction fittings, and buckles.

5. The caddy of claim 3, further comprising a shoulder strap coupled to the pair of coupling members.

6. The caddy of claim 1, wherein the first and second straps are rigid along their entire lengths.

7. The caddy of claim 1, wherein the first and second straps are flat.

8. The caddy of claim 1, wherein the coupling device is a quick connect disconnectable by a single hand.

9. The caddy of claim 1, wherein the coupling device includes a length of highly elastic cord.

10. A fishing pole caddy, comprising:
    a) a first strap having an interior end and an exterior end;
    b) a second strap having an interior end and an exterior end, the interior end of the second strap being selectably removably coupled to the interior end of the first strap by a coupling device; wherein the coupling device is a quick connect disconnectable by a single hand;
    c) an effective length adjustment device functionally coupled to at least one of the first strap and second strap such that an effective length thereof is adjustable; and
    d) a first sheath coupled to the exterior end of the first strap such that a terminal portion of the exterior end of the first strap extends beyond a far end of the first sheath and shaped and orientated to receive an end of a fishing pole from an interior direction corresponding with the interior end of the first strap, wherein the first sheath is a rigid, capped, hollow, empty body having only a single hollow chamber.

11. The caddy of claim 10, further comprising a second sheath coupled to the exterior end of the second strap and shaped and orientated to receive an end of a fishing pole from an interior direction corresponding with the interior end of the second strap, wherein the second sheath is a rigid capped, hollow, empty body having only a single hollow chamber.

12. The caddy of claim 11, further comprising a movable handle coupled to at least one of the first and second straps.

13. The caddy of claim 12, further comprising a pair of coupling members each disposed at the exterior end of the first and second straps.

14. The caddy of claim 13, wherein the coupling members is a coupling member selected from the group consisting of clips, hooks, anchors, rings, buttons, hook and loops, hoops, fasteners, snaps, pins, zippers, ties, friction fittings, and buckles.

15. The caddy of claim 14, further comprising a shoulder strap coupled to the pair of coupling members.

16. The caddy of claim 15, wherein the first and second straps are rigid along their entire lengths.

17. The caddy of claim 16, wherein the first and second straps are flat.

18. A fishing pole caddy, comprising:
   a) a first strap having an interior end and an exterior end;
   b) a second strap having an interior end and an exterior end, the interior end of the second strap being selectably removably coupled to the interior end of the first strap by a coupling device;
   c) an effective length adjustment device functionally coupled to at least one of the first strap and second strap such that an effective length thereof is adjustable;
   d) a first sheath coupled to the exterior end of the first strap and shaped and orientated to receive an end of a fishing pole from an interior direction corresponding with the interior end of the first strap, wherein the first sheath consists of a single capped hollow body having a single chamber;
   e) a second sheath coupled to the exterior end of the second strap and shaped and orientated to receive an end of a fishing pole from an interior direction corresponding with the interior end of the second strap, wherein second sheath consists of a single capped hollow body having a single chamber;
   f) a pair of coupling members each disposed at the exterior end of the first and second straps and extending outwardly from a terminal portion thereof beyond an adjacent first or second sheath; wherein the coupling members is a coupling member selected from the group consisting of clips, hooks, anchors, rings, buttons, hook and loops, hoops, fasteners, snaps, pins, zippers, ties, friction fittings, and buckles; wherein the first and second, straps are flat; and
   g) a shoulder strap coupled to the pair of coupling members.

* * * * *